(12) United States Patent
Sekihata

(10) Patent No.: US 7,352,746 B1
(45) Date of Patent: Apr. 1, 2008

(54) FRAME FORWARDING INSTALLATION

(75) Inventor: Osamu Sekihata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/543,754

(22) Filed: Apr. 5, 2000

(30) Foreign Application Priority Data

Jun. 18, 1999 (JP) .................................. 11-171941

(51) Int. Cl.
*H04L 12/28* (2006.01)

(52) U.S. Cl. ...................... 370/390; 370/391; 370/392; 370/432

(58) Field of Classification Search ................ 370/217, 370/225, 235, 252, 352, 349, 389, 390, 392, 370/391, 432, 437, 465, 468, 227, 228, 237
See application file for complete search history.

(56) References Cited

U.S. PATENT DOCUMENTS

| | | | | |
|---|---|---|---|---|
| 5,175,765 A | * | 12/1992 | Perlman ....................... 380/30 |
| 5,502,817 A | * | 3/1996 | Krone et al. ................. 709/243 |
| 5,519,640 A | * | 5/1996 | Ganesan et al. ............ 709/236 |
| 5,734,654 A | * | 3/1998 | Shirai et al. ................. 370/396 |
| 5,751,954 A | * | 5/1998 | Saito .......................... 709/245 |
| 5,883,891 A | * | 3/1999 | Williams et al. ............ 370/356 |
| 5,909,439 A | * | 6/1999 | Kuwabara et al. .......... 370/389 |
| 6,167,030 A | * | 12/2000 | Kilkki et al. ................ 370/236 |
| 6,175,571 B1 | * | 1/2001 | Haddock et al. ............. 370/423 |
| 6,240,073 B1 | * | 5/2001 | Reichman et al. .......... 370/319 |
| 6,249,521 B1 | * | 6/2001 | Kerstein ..................... 370/389 |
| 6,256,297 B1 | * | 7/2001 | Haferbeck et al. .......... 370/310 |
| 6,259,829 B1 | * | 7/2001 | Bleecker et al. ............. 382/306 |
| 6,275,471 B1 | * | 8/2001 | Bushmitch et al. ......... 370/248 |
| 6,292,484 B1 | * | 9/2001 | Oliver ........................ 370/389 |
| 6,310,878 B1 | * | 10/2001 | Bodnar et al. .............. 370/396 |
| 6,317,429 B1 | * | 11/2001 | Nakata et al. .............. 370/360 |
| 6,327,267 B1 | * | 12/2001 | Valentine et al. ........... 370/466 |
| 6,418,142 B1 | * | 7/2002 | Wolf .......................... 370/390 |
| 6,512,761 B1 | * | 1/2003 | Schuster et al. ............ 370/352 |
| 2002/0070958 A1 | * | 6/2002 | Yeo et al. .................... 345/723 |
| 2002/0075878 A1 | * | 6/2002 | Lee et al. .................... 370/401 |

FOREIGN PATENT DOCUMENTS

| | | |
|---|---|---|
| JP | 5-219115 | 8/1993 |
| JP | 6-14056 | 1/1994 |

\* cited by examiner

*Primary Examiner*—Chi Pham
*Assistant Examiner*—Shick Hom
(74) *Attorney, Agent, or Firm*—Katten Muchin Rosenman LLP

(57) ABSTRACT

A frame forwarding installation on the side of a transmitting terminal refers to a header of a received frame and determines whether a host application is a real-time application. If the application is a real-time application, the received frame is sent to a plurality of paths in the direction of a destination. When a frame received from a path is transmitted to a destination terminal, a frame forwarding installation on the side of the destination terminal stores the identifier of this frame in a storage unit and, if a frame then newly arrives from a path, determines whether the frame identifier of this frame has been stored in the storage unit. If the newly arriving frame has been stored, it is regarded as being a frame already received and is discarded. If the newly arriving frame is not a frame that has already been received, the received frame is transmitted to the destination terminal and the identifier of this frame is stored.

11 Claims, 17 Drawing Sheets

| DESTINATION ADDRESS | INPUT/OUTPUT INTERFACE | SUCCEEDING FRAME FORWARDING INSTALLATION (ROUTER) |
|---|---|---|
| A1 | | |
| | | |
| A2 | | |
| | | |
| ---- | ---- | ---- |

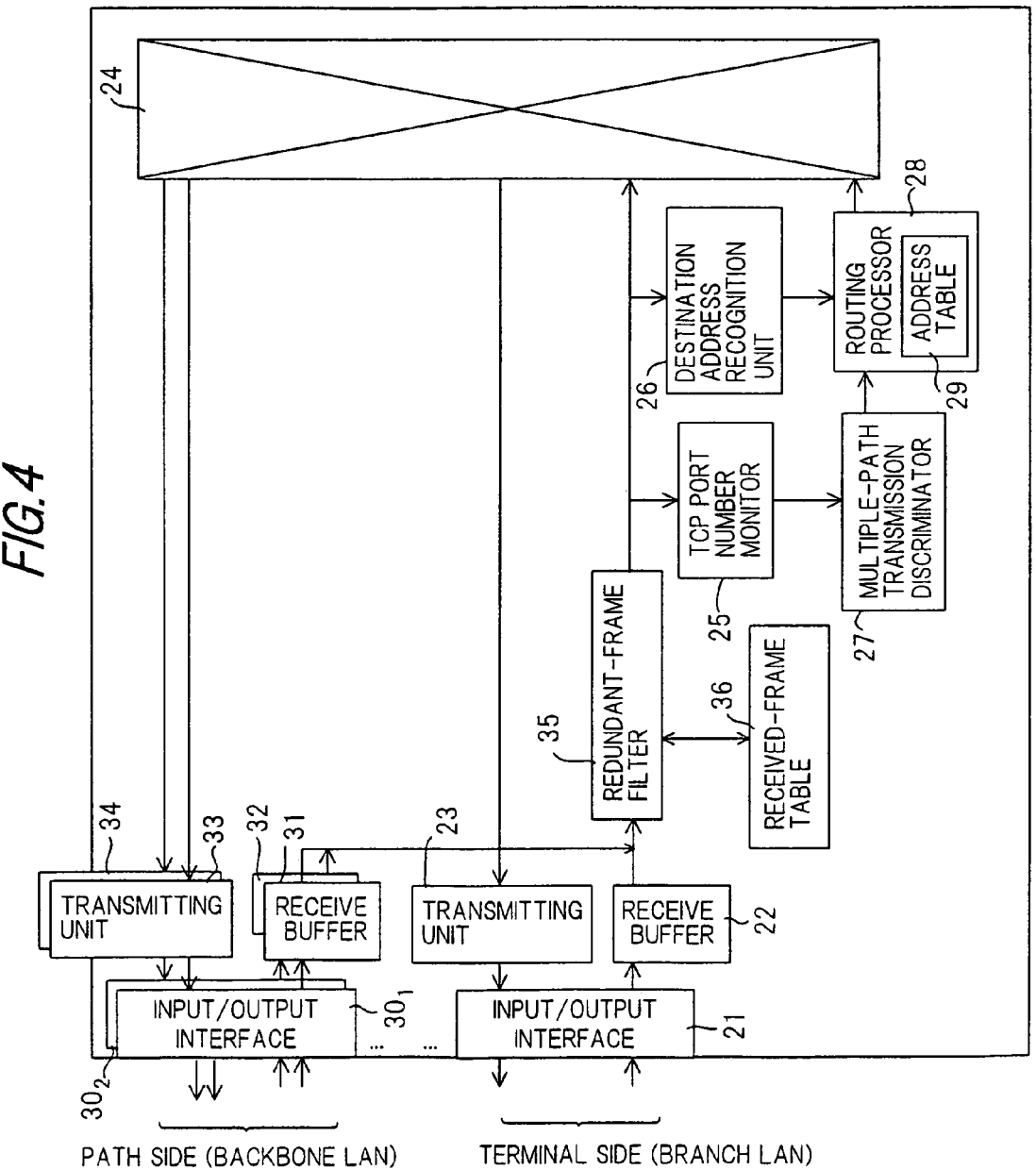

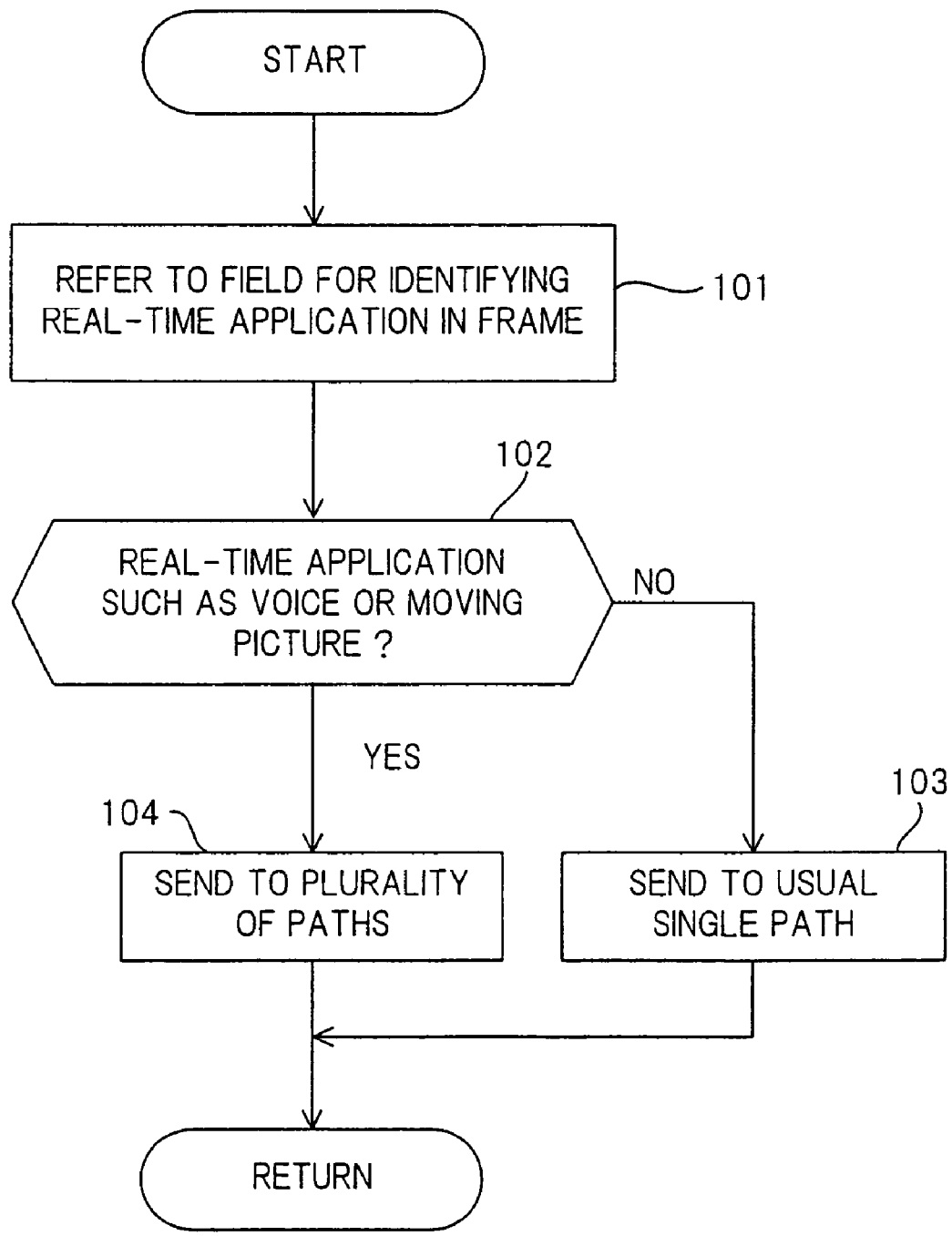

FRAME FORWARDING INSTALLATION

BACKGROUND OF THE INVENTION

This invention relates to technology for maintaining communication quality and communication reliability in a local-area network (LAN). This technology is applicable to frame forwarding installations such as routers and switches that construct a LAN, is highly likely to be applied in the future and is essential in terms of improving the quality and reliability of networks.

More specifically, the present invention relates to a frame forwarding installation in a network such as a LAN and, more particularly, to a frame forwarding installation for sending frames, which require a real-time property and quality/reliability, to plurality of paths, and to a frame forwarding installation for accepting, and transmitting to a destination terminal, only a first arriving frame of identical frames that arrive from a plurality of paths, and discarding frames other than the first arriving frame.

It is required that the quality and reliability of communication in networks be improved. In order to improve the quality of communication in a conventional LAN, frame transmission delay and transmission fluctuation (a variance in transmission delay) are reduced. To achieve this, processing speed is raised by using hardware to implement routing processing or by executing preferential processing in regard to frames having priority.

Achieving an improvement in reliability is carried out by adopting so-called redundancy or by adopting a so-called hot-standby method, in which the LAN device itself is provided with redundancy to establish active and standby channels so that the standby channel will be switched to automatically if the active channel fails.

Meanwhile, it has been decided that there will be one path from a transmission source to a destination in a LAN. In order to generate the path automatically, the optimum path is calculated using a routing protocol referred to as RIP (Routing Information Protocol) or OSPF (Open Shortest Path First). If a failure occurs, the path can be changed dynamically. There are also occasions where static routing is performed to decide a static path using an address table. In either case, however, there is only one end-to-end path in a LAN at one time.

Thus, in the prior art, an improvement in reliability and quality is attempted on a single path. As a consequence, even if it is attempted to improve quality by improving processing performance at each node in a network or by performing preferential control, frame processing is delayed if a point along the path develops a very high load, thus making it difficult to maintain communication quality. Further, even if it is attempted to improve reliability by adopting redundancy in devices and modules, this does not redress faults in the transmission line, for example, and it is therefore not possible to assure perfect reliability.

SUMMARY OF THE INVENTION

Accordingly, an object of the present invention is to arrange it so that communication quality can be maintained even if a path becomes congested and so that communication can be continue even if a path fault develops.

Another object of the present invention is to provide a frame forwarding installation for sending frames, which require a real-time property and quality/reliability, to a plurality of paths leading to a destination, thereby maintaining the quality and reliability of communication.

Still another object of the present invention is to provide a frame forwarding installation for accepting, and transmitting to a destination terminal, only a first arriving frame of identical frames that arrive via a plurality of paths, and discarding frames other than the first arriving frame, thereby maintaining the quality and reliability of communication.

A further object of the present invention is to provide a network in which communication quality can be maintained even if a path becomes congested and in which communication can be continue even if a path fault develops.

According to a first aspect of the present invention, a frame forwarding installation on the side of a transmitting terminal sends a received frame in the direction of a destination over a plurality of paths if a host application of the transmitting terminal is a real-time application. A frame forwarding installation on the side of a destination terminal sends a first arriving frame to the destination terminal and discards later arriving frames.

In this case, the frame forwarding installation on the side of the transmitting terminal determines whether the application of a host layer is a real-time application upon referring to a header of the received frame. More specifically, when a port number included in the header of a received frame matches a port number of the real-time application, it is judged that the application of the host layer is a real-time application. Further, the frame forwarding installation on the side of the transmitting terminal has an address table which specifies a plurality of interface units in association with a destination address. If the application of the host layer is a real-time application, the frame forwarding installation sends a received frame to a plurality of paths via a plurality interface units that conform to a destination address. Further, the frame forwarding installation on the side of the transmitting terminal attaches a tag, which includes a frame identifier, to a frame and then sends the frame to a plurality of paths.

A frame forwarding installation on the side of a destination terminal stores the identifier of a frame, which has been received from a path and transmitted to the destination terminal, in a memory, checks to determine whether a frame identifier of a frame newly received from a path has been stored in the memory and, if the frame identifier has been stored in the memory, discards this received frame by reason of the fact that this frame has already been received. If the frame has not already been received, the frame forwarding installation transmits this received frame to the destination terminal and stores the identifier of this received frame. In this case, the frame identifier is a sequence number included in a header, or a computational result obtained by subjecting a specific portion of the received frame to a fixed computation, or a frame identifier included in a tag that has been attached to a received frame.

If the arrangement described above is adopted, a frame having a real-time property, such as voice or a moving image, can be sent to a plurality of paths simultaneously. If one path becomes congested or fails, the frame can be received from another normal path. This makes it possible to improve the quality and reliability of communication.

According to a second aspect of the present invention, a frame forwarding installation on the side of a transmitting terminal sends a received frame in the direction of a destination over a plurality of paths if the type of a host application of the transmitting terminal is a predetermined type, e.g., if the host application is an application that places importance on quality/reliability. A frame forwarding installation on the side of a destination terminal sends a first arriving frame to the destination terminal and discards later arriving frames. If this arrangement is adopted, frames requiring high quality/high reliability can be sent to a plurality of paths simultaneously and communication quality and reliability can be improved even if a path becomes congested or develops a fault.

According to a third aspect of the present invention, a frame forwarding installation on the side of a transmitting terminal sends a received frame in the direction of a destination over a plurality of paths if a destination address or destination-source address of the received frame matches an address that has already been registered. A frame forwarding installation on the side of a destination terminal sends a first arriving frame to the destination terminal and discards later arriving frames. If this arrangement is adopted, a frame can be communicated with high quality and high reliability, even if a path develops congestion or a fault, by registering beforehand a transmission-source address for transmitting a frame requiring a real-time property or high quality/high reliability or a destination-terminal address which desires to receive service having a high quality/high reliability.

Other features and advantages of the present invention will be apparent from the following description taken in conjunction with the accompanying drawings.

BRIEF DESCRIPTION OF THE DRAWINGS

FIG. 4 is a block diagram illustrating a modification of the frame forwarding installation according to the first embodiment;

FIG. 5 is a flowchart of first transmission processing executed by a frame forwarding installation on the side of a transmitting terminal;

DESCRIPTION OF THE PREFERRED EMBODIMENTS (A) Overview of the Present Invention

Figure 1A:
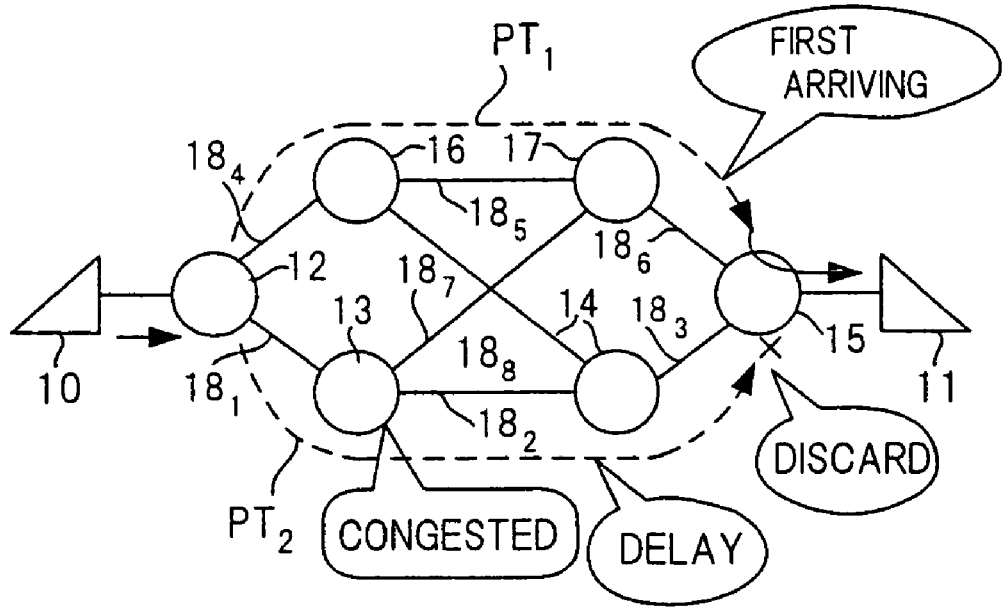
FIGS. 1A and 1B are diagrams useful in describing an overview of the present invention.
Figure 1B:
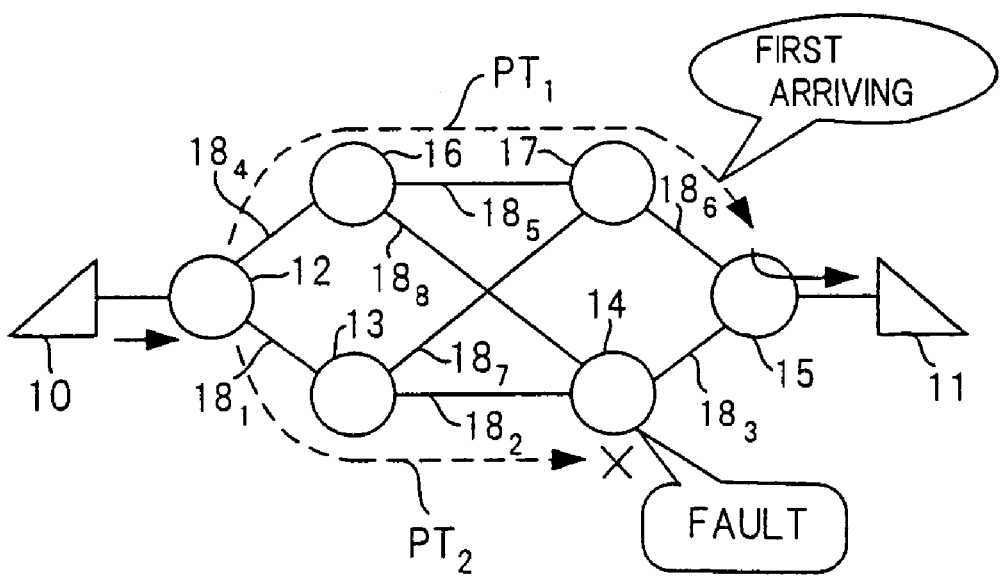

FIGS. 1A and 1B are diagrams useful in describing an overview of the present invention, in which FIG. 1A is for describing an improvement in quality and FIG. 1B an improvement in reliability. Shown in FIGS. 1A and 1B are a transmitting terminal 10, a destination terminal 11, nodes (frame forwarding installations such as routers and switches) 12 to 17 constructing a backbone LAN, and paths $18_1$ to $18_8$ connecting the nodes. The node 12 is a frame forwarding installation on the side of the transmitting terminal and receives a frame sent from the transmitting terminal, and the node 15 is a frame forwarding installation on the side of the destination terminal and transmits a frame, which has been received from a path, to the destination terminal 11. Though not illustrated, each node constructs a separate branch LAN.

(a) Transmission of Frames Having a Real-Time Property

The frame forwarding installation 12 determines whether a host application of the transmitting terminal 10 is a real-time application upon referring to the header of a frame received from the transmitting terminal 10. If the application is a real-time application, the frame forwarding installation sends the received frame in the direction of the destination over the plurality of paths $18_1$, $18_4$. The frame forwarding installation 15 on the side of the destination terminal stores the identifier of the frame, which has been received from a path and transmitted to the destination terminal 11, in a memory. The frame forwarding installation 15 determines whether the frame identifier of a newly received frame has been stored in the memory, i.e., whether this frame has already been received. If the frame has already been received, the frame forwarding installation 15 discards this received frame. If the frame has not already been received, the frame forwarding installation 15 transmits this received frame to the destination terminal 11 and stores the identifier of this received frame. If one path $PT_2$ of two paths $PT_1$, $PT_2$ becomes congested (FIG. 1A), or if path $PT_2$ develops a fault (FIG. 1B), the frame from the path $PT_1$ will arrive at the frame forwarding installation 15 first and the frame forwarding installation 15 will transmit this frame to the destination terminal 11 and discard the frame that arrives later via the path $PT_2$ (FIG. 1A). It should be noted that if a path becomes faulty in FIG. 1B, there will be no later arriving frame.

If this arrangement is adopted, a frame having a real-time property, such as voice or a moving image, can be sent to a plurality of paths simultaneously. Even if a path becomes congested or faulty, it is possible to improve the quality and reliability of communication of frames having a real-time property. Since a frame which does not have a real-time property is sent on a single path as heretofore, it is possible reduce the frequency of network congestion.

(b) Transmission of Frames that Place Importance on Quality/Reliability

If it is found by referring to the header of a frame received from the transmitting terminal 10 that the type of host application of the transmitting terminal is a predetermined type, e.g., that the host application is one which emphasizes quality/reliability (one example of such an application is an FTP application), then the frame forwarding installation 12 sends the received frame in the direction of the destination over the plurality of paths $18_1$, $18_4$. Operation from this point onward is similar to that in the case of a real-time application. If this arrangement is adopted, frames requiring high quality/high reliability can be sent to a plurality of paths simultaneously and communication quality and reliability can be improved even if a path becomes congested or develops a fault. Since a frame which does not require high quality/high reliability is sent on a single path as heretofore, it is possible reduce the frequency of network congestion.

(c) If Addresses Match

If a destination address or transmission-source address included in the header of a frame received from the transmitting terminal 10 matches an address already registered, the frame forwarding installation 12 sends the received frame in the direction of the destination over the plurality of paths $18_1$, $18_4$. Operation from this point onward is similar to that in the case of a real-time application. If this arrangement is adopted, a frame can be communicated with high quality and high reliability, even if a path develops congestion or failure, by registering beforehand a transmission-source address for transmitting a frame requiring a real-time property or high quality/high reliability or a destination-terminal address which desires to receive a frame having a high quality/high reliability. This makes it possible to provide terminals and hosts with a high level of service in terms of quality and reliability.

(B) First Embodiment (a) Frame Forwarding Installation

Figure 2:
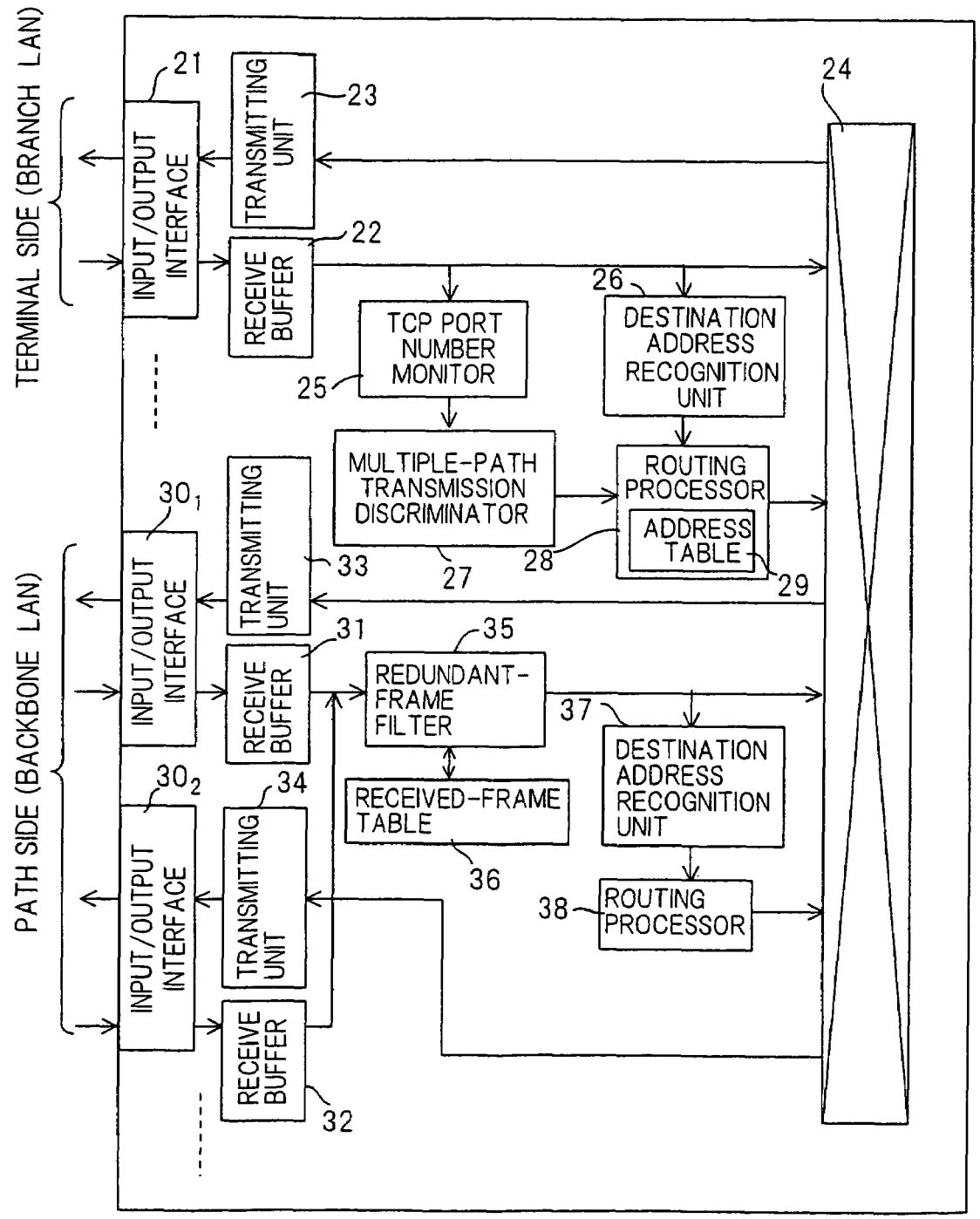
FIG. 2 is a block diagram illustrating the construction of a frame forwarding installation according to a first embodiment of the present invention.

FIG. 2 is a block diagram showing the construction of a frame forwarding installation according to a first embodiment of the present invention.

An input/output interface 21 sends frames to and receives frames from a terminal on the side of a branch LAN. Connected to the input/output interface 21 are a receive buffer 22 for temporarily storing a frame received from a terminal, and a transmitting unit 23 for transmitting the frame to a terminal. The output side of the receive buffer 22 and the input side of the transmitting unit 23 are connected to a switch 24. The frame output from the receive buffer 22 is input to the switch 24 and is input also to a TCP port number monitor 25 and destination address recognition unit 26. The TCP port number monitor 25 refers to a TCP/UDP header and determines whether a host application of the transmitting terminal is a real-time application. If it is assumed that a real-time application has to be recognized from a frame which uses a protocol for a real-time application, e.g., the RTP (Real-time Transport Protocol), the TCP port number monitor 25 refers to a port number contained in the TCP/UDP header and determines whether the host application is a real-time application. The reason for this is that a port number 5004 has been assigned as the RTP default value.

Figures 3, 12:
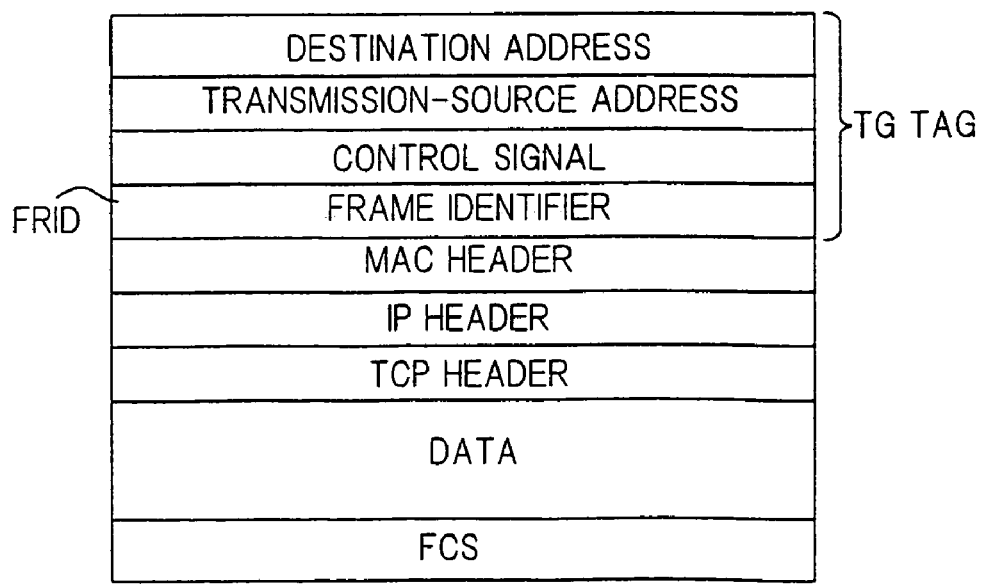
FIG. 3 is an address table.
FIG. 12 is a diagram useful in describing a frame to which a tag has been attached.

If the host application is a real-time application, a multiple-path transmission discriminator 27 instructs a routing processor 28 to send a received frame to a plurality of paths (e.g., two paths). Further, the destination address recognition unit 26 extracts the destination address contained in an IP header and inputs this address to the routing processor 28. The latter has an address table 29 (see FIG. 3) for specifying a plurality of input/output interfaces associated with a destination address. FIG. 3 illustrates an example of the address table 29, in which a plurality of input/output interfaces and succeeding frame forwarding installations (routers) have been stored in association with a destination address (IP address).

If the routing processor 28 is instructed to send a frame to a plurality of paths, the routing processor 28 refers to the address table 29, obtains two input/output interfaces (e.g., input/output interfaces $30_1$, $30_2$) that conform to a destination address and instructs the switch 24 to send the frame to the input/output interfaces $30_1$, $30_2$. In the usual case where a frame is sent to only a single path, the routing processor 28 instructs the switch 24 to send the received frame to a path of the backbone LAN via the first input/output interface that has been stored in correspondence with the destination address.

The input/output interfaces $30_1$, $30_2$ send frames to and receive frames from the paths of the backbone LAN. Connected to the input/output interfaces $30_1$, $30_2$ are receive buffers 31, 32, respectively, for temporarily storing frames received from the backbone paths, and transmitting units 33, 34, respectively, for transmitting frames to the backbone paths. The output sides of the receive buffers 31, 32 are connected to the switch 24 via a redundant-frame filter 35, and the input sides of the transmitting units 33, 34 are connected directly to the switch 24.

The redundant-frame filter 35, which has a received-frame table 36 for storing the identifier of a frame received from a backbone path and sent to the switch 24, determines whether the frame identifier of a frame output from the receive buffers 31, 32 has been stored in the received-frame table 36. If the frame identifier has been stored in the table 36, i.e., if the frame has already been received, the redundant-frame filter 35 discards this frame. If the frame is not one that has already been stored, however, the redundant-frame filter 35 outputs this frame to the switch side and stores the identifier of the frame in the received-frame table 36. As a result, even though the same frame is sent to a plurality of paths, only the first arriving frame is accepted and the later arriving frames are discarded. The frame identifier that has been stored in the received-frame table 36 is erased upon elapse of a fixed length of time.

A destination address recognition unit 37 extracts the destination address from a frame that has not been discarded by the redundant-frame filter 35 and inputs this address to a routing processor 38. The latter executes routing processing and notifies the switch 24 of the destination to which the frame is to be sent. For example, if the received frame is to be transmitted to a terminal, the routing processor 38 instructs the switch 24 to send the frame to the input/output interface 21. On the other hand, if the received frame is to be sent to an output path that is different from the input path, the routing processor 38 instructs the switch 24 to send the frame to the input/output interface that conforms to this output path.

In order to simplify the description, the destination address recognition units 26, 37 are separately provided and so are the routing processors 28, 38. However, an arrangement can be adopted in which the apparatus shares a single destination address recognition unit and a single routing processor. FIG. 4 illustrates an example of the arrangement of a frame forwarding installation in which the destination address recognition unit 26 and the routing processor 28 are shared.

(b) Modification

In the description rendered above, the TCP port number monitor 25 refers to a TCP/UDP header to determine whether the host application of a transmitting terminal is a real-time application. However, the following arrangement can also be adopted: Specifically, in a modification, the TCP port number monitor 25 determines whether the type of a host application is a predetermined type, e.g., if the host application is an application that places importance on quality/reliability. If the decision rendered is "YES", then the TCP port number monitor 25 instructs the multiple-path transmission discriminator 27 to send a received frame to a plurality of paths. An example of an application that places importance on quality/reliability is one that uses an FTP protocol, wherein the port number of the FTP protocol is "21". Accordingly, the TCP port number monitor 25 determines whether a host application is an application that places importance on quality/reliability by referring to the port number of the TCP/UDP header.

If the host application is an application that places importance on quality/reliability, the multiple-path transmission discriminator 27 instructs the routing processor 28 to send the received frame to a plurality of paths (e.g., to two paths).

(c) Transmission Processing (c-1) When Reference is Made to a Real-Time Application FIG. 5 is a flowchart of transmission processing executed by a frame forwarding installation on the side of a transmitting terminal for sending a frame to a plurality of paths in a case where a host application is a real-time application.

If a frame is received from the terminal of a branch LAN, the TCP port number monitor 25 refers to the TCP port number of the TCP header (step 101) and determines whether the host application is a real-time application (step 102). If the application is not a real-time application, the routing processor 28 instructs the switch 24 to send the received frame to one path that conforms to the destination address (step 103). If the application is a real-time application, however, then the multiple-path transmission discriminator 27 instructs the routing processor 28 to send the received frame to a plurality of paths. As a result, the routing processor 28 refers to the address table 29 and controls the switch 24 in such a manner that the received frame is sent to two or more paths conforming to the destination address (step 104). The above-described processing is thenceforth repeated whenever a frame is received from a terminal, thereby sending frames to the network paths of the backbone LAN.

Figure 6:
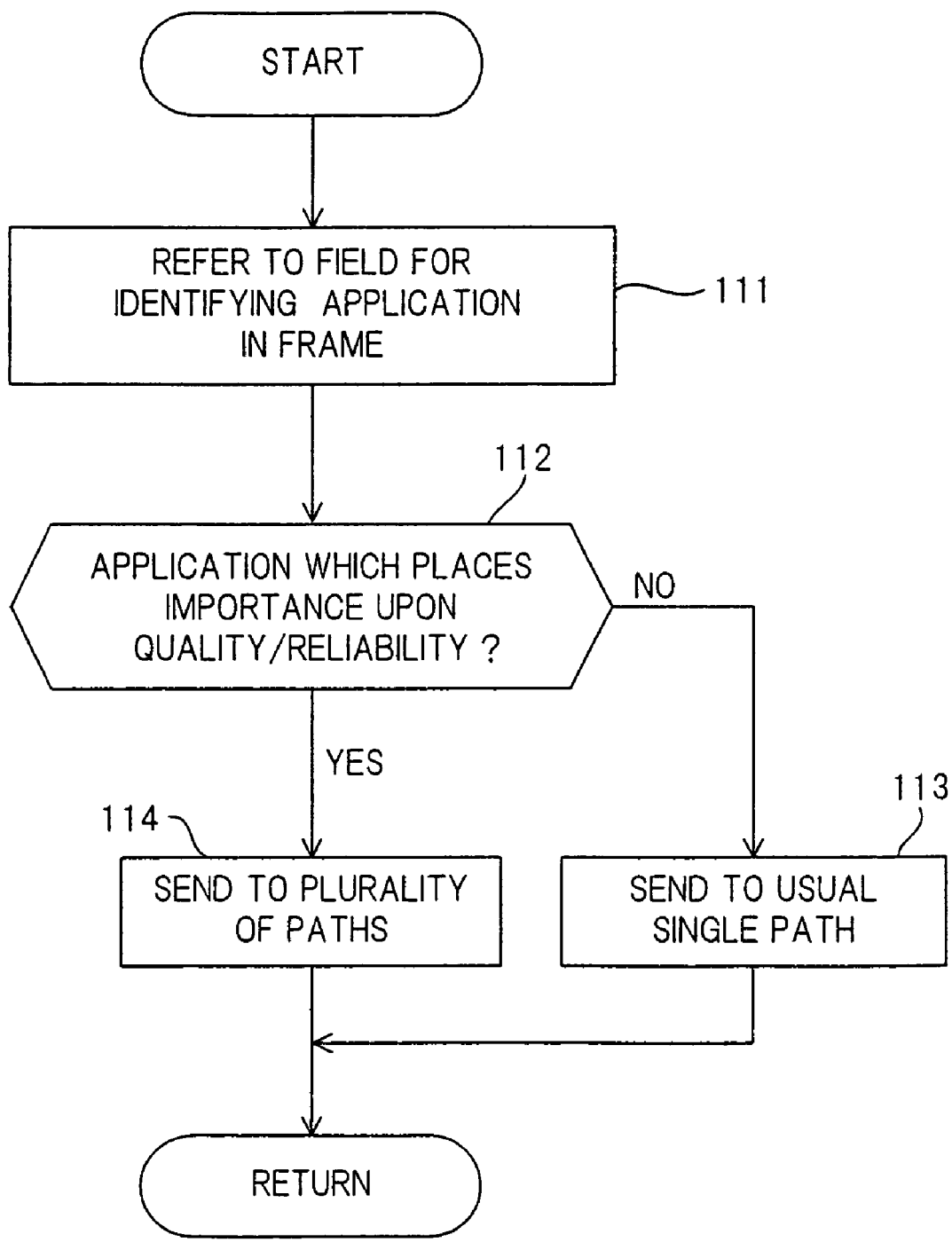
FIG. 6 is a flowchart of second transmission processing executed by a frame forwarding installation on the side of a transmitting terminal.

(c-2) When Reference is Made to an Application that Emphasizes Quality/Reliability FIG. 6 is a flowchart of transmission processing executed by a frame forwarding installation on the side of a transmitting terminal for sending a frame to a plurality of paths in a case where a host application is an application that places importance upon quality/reliability.

If a frame is received from the terminal of a branch LAN, the TCP port number monitor 25 refers to the TCP port number of the TCP header (step 111) and determines whether the host application is an application that places importance upon quality/reliability (step 112). If the application is not an application that places importance upon quality/reliability, the routing processor 28 instructs the switch 24 to send the received frame to one path that conforms to the destination address (step 113). If the application is an application that places importance upon quality/reliability, however, then the multiple-path transmission discriminator 27 instructs the routing processor 28 to send the received frame to a plurality of paths. As a result, the routing processor 28 refers to the address table 29 and controls the switch 24 in such a manner that the received frame is sent to two or more paths conforming to the destination address (step 114). The above-described processing is thenceforth repeated whenever a frame is received from a terminal, thereby sending frames to the network paths of the backbone LAN.

Figure 7:
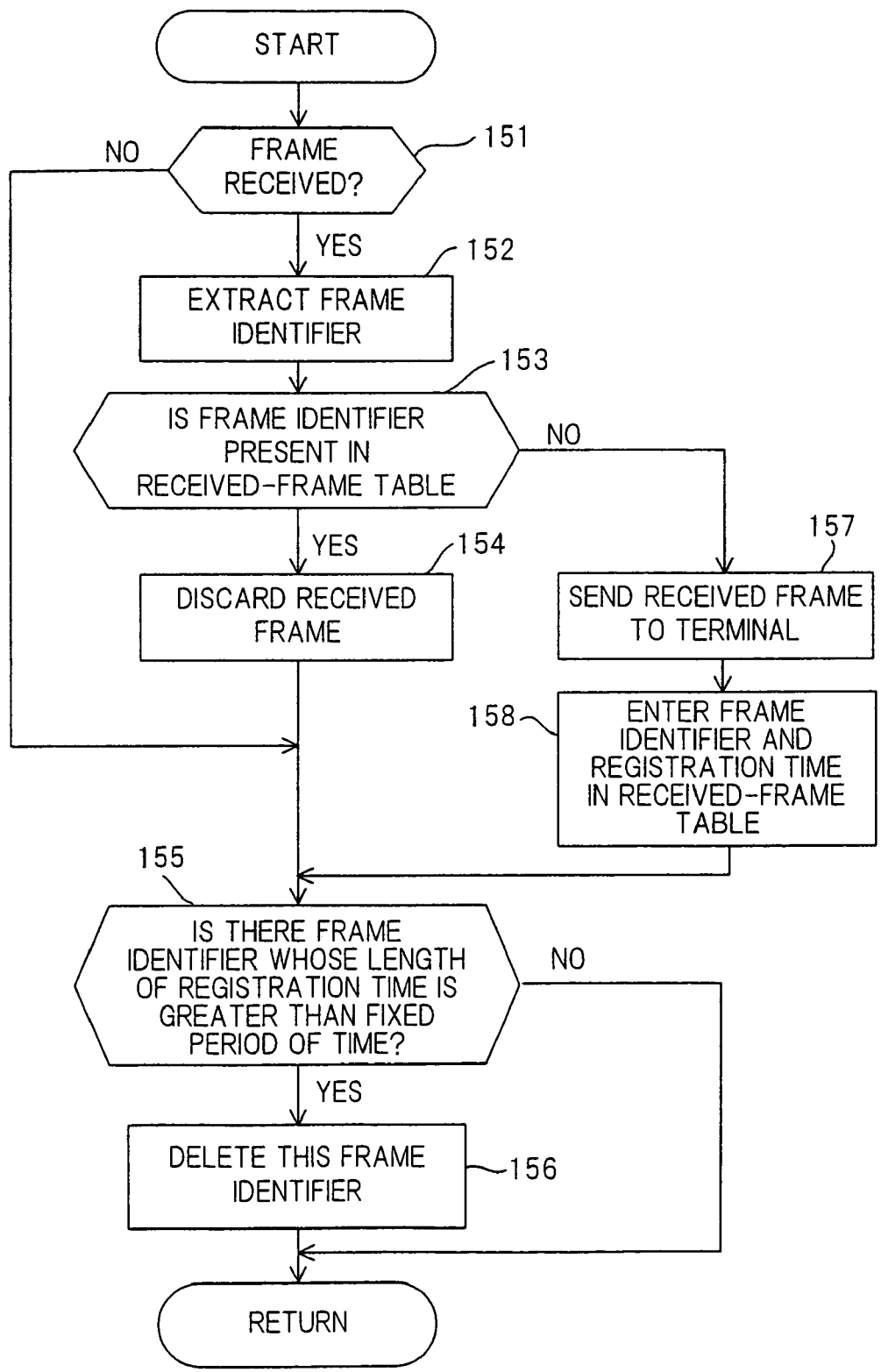
FIG. 7 is a flowchart of first reception processing executed by a frame forwarding installation on the side of a receiving terminal.

(d) Reception Processing (d-1) When a Sequence Number is Adopted as a Frame Identifier FIG. 7 is a flowchart of reception processing executed by a frame forwarding installation on the side of a destination terminal.

The redundant-frame filter 35 of the frame forwarding installation on the side of the destination terminal checks to see whether a frame has been received from a path of a backbone LAN (step 151). If a frame has been received, the redundant-frame filter 35 extracts the frame identifier (e.g., the sequence number SN of the TCP header) from the received frame (step 152), checks to determine whether the frame identifier is present in the received-frame table 36 (step 153) and, if it is, discards the received frame (step 154).

Next, it is determined whether frame identifiers that have been registered in the received-frame table 36 include a frame identifier that has been registered for a period of time greater than a fixed period of time (step 155). If the decision rendered is "YES", then this frame identifier is deleted from the table (step 156). If the decision rendered is "NO", then no particular operation is performed and control returns to the beginning to repeat the above-described processing.

If it is determined at step S153 that the frame identifier does not exist in the received-frame table 36, on the other hand, the redundant-frame filter 35 outputs the received frame to the side of the switch 24. The destination address recognition unit 37 extracts the destination address from the header and inputs this address to the routing processor 38. The latter refers to the destination address, recognizes that the frame is one to be sent to a terminal of the branch LAN and transmits the received frame to the destination terminal via the switch 24 (step 157).

Next, the redundant-frame filter 35 enters the frame identifier (sequence number) of the received frame and the present time (registration time) in the received-frame table 36 (step 158). Processing is then executed from step 155 onward.

It should be noted that if a frame is not received at step S151, processing from step 155 onward is executed.

Thus, even though the same frame is sent to a plurality of paths from the frame forwarding installation on the side of the transmitting terminal, the frame forwarding installation on the side of the destination terminal accepts only the first arriving frame, transmits this frame to the destination terminal and discards later arriving frames.

Though the sequence number of a TCP header is adopted as the frame identifier in the description given above, the checksum (CS) of the TCP header can also be used as a frame identifier.

(d-2) When a Computational Result is Adopted as a Frame Identifier

Figure 8:
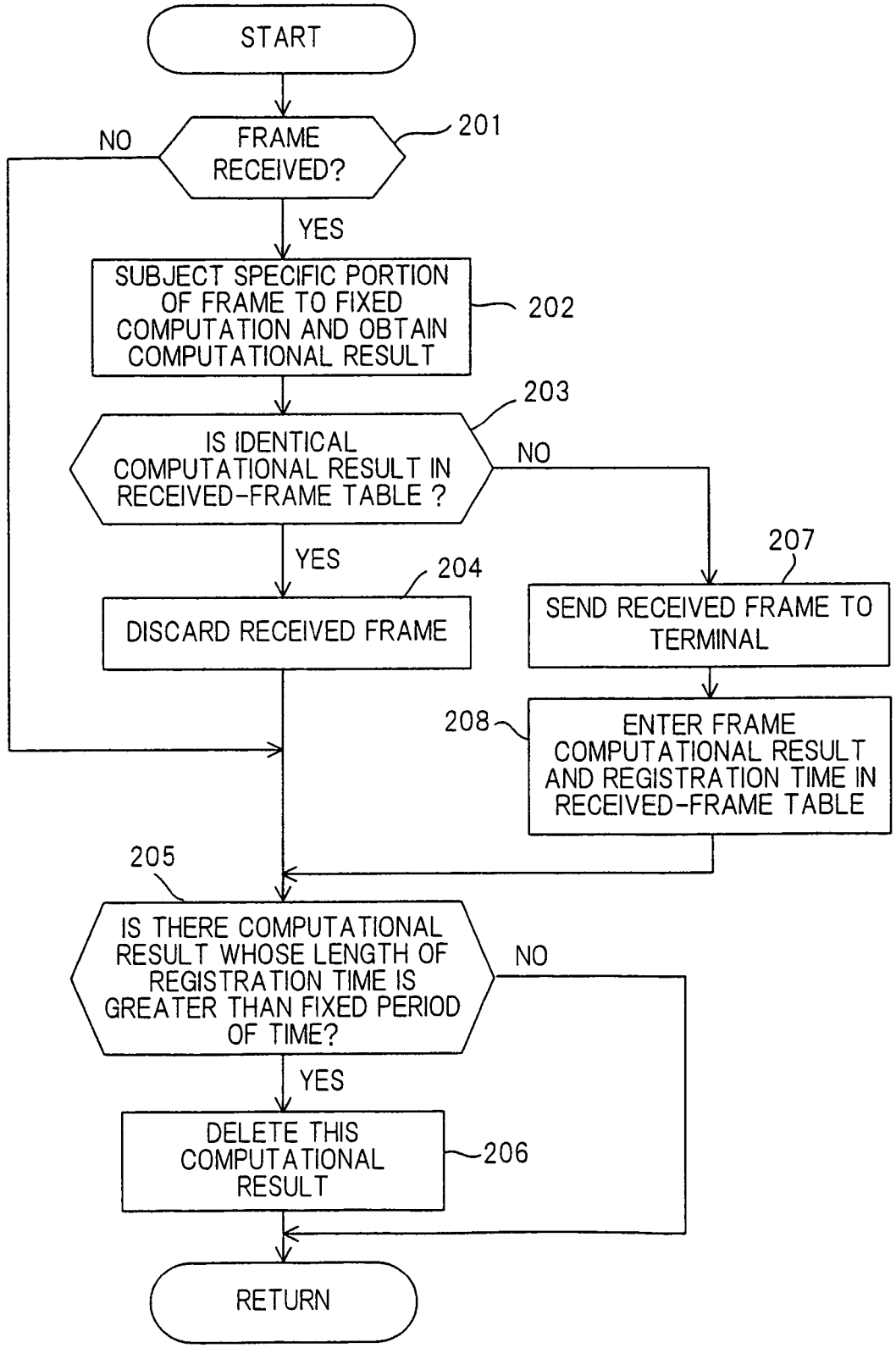
FIG. 8 is a flowchart of second reception processing executed by a frame forwarding installation on the side of a receiving terminal.

FIG. 8 is a flowchart of different reception processing executed by a frame forwarding installation on the side of a destination terminal.

The redundant-frame filter 35 of the frame forwarding installation on the side of the destination terminal checks to see whether a frame has been received from a path (step 201). If a frame has been received, the redundant-frame filter 35 subjects a specific portion of the frame to a fixed computation, obtains the result of the computation and adopts the result as the frame identifier (step 202). For example, the redundant-frame filter 35 applies a CRC operation or a checksum operation to the data portion of the frame from which the header is excluded (i.e., to the payload) and adopts the computational result of this operation as the frame identifier.

Next, the redundant-frame filter 35 checks to determine whether the computational result is present in the received-frame table 36. If it is, the redundant-frame filter 35 discards the received frame (step 204).

Next, it is determined whether frame identifiers that have been registered in the received-frame table 36 include a frame identifier that has been registered for a period of time greater than a fixed period of time (step 205). If the decision rendered is "YES", then this frame identifier is deleted from the table (step 206). If the decision rendered is "NO", then no particular operation is performed and control returns to the beginning to repeat the above-described processing.

If it is determined at step S203 that the result of the operation does not exist in the received-frame table 36, on the other hand, the redundant-frame filter 35 outputs the received frame to the side of the switch 24. The destination address recognition unit 37 extracts the destination address from the header and inputs this address to the routing processor 38. The latter refers to the destination address, recognizes that the frame is one to be sent to a terminal of the branch LAN and transmits the received frame to the destination terminal via the switch 24 (step 207).

Next, the redundant-frame filter 35 enters the computational result (frame identifier) of the received frame and the present time (registration time) in the received-frame table 36 (step 208). Processing is then executed from step 205 onward.

It should be noted that if a frame is not received at step S201, processing from step 205 onward is executed.

Thus, even though the same frame is sent to a plurality of paths from the frame forwarding installation on the side of the transmitting terminal, the frame forwarding installation on the side of the destination terminal accepts only the first arriving frame, transmits this frame to the destination terminal and discards later arriving frames.

(C) Second Embodiment

Figure 9:
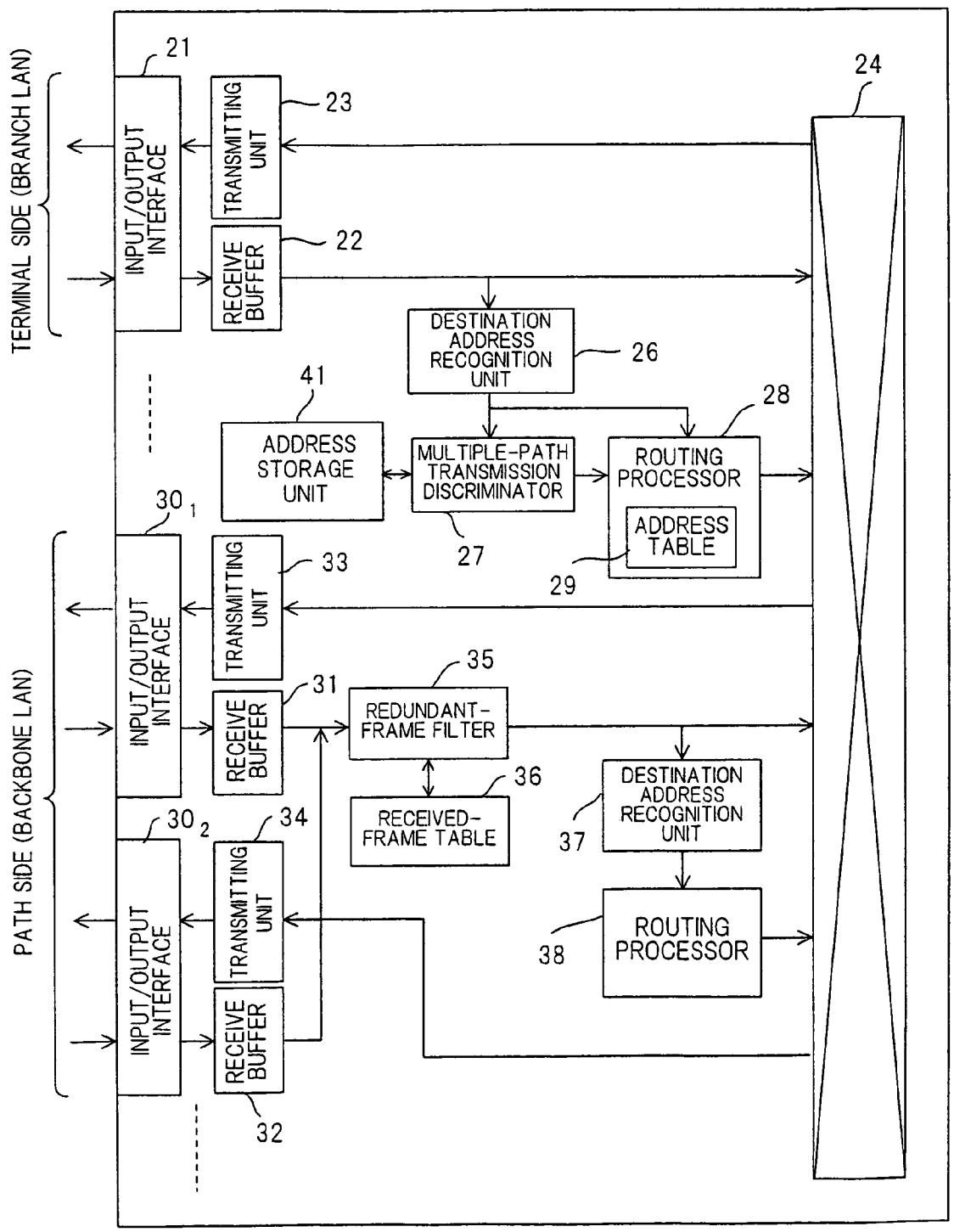
FIG. 9 is a block diagram illustrating the construction of a frame forwarding installation according to a second embodiment of the present invention.

FIG. 9 is a block diagram showing the construction of a frame forwarding installation according to a second embodiment of the present invention. Components in FIG. 9 identical with those of the first embodiment shown in FIG. 2 are designated by like reference characters. This embodiment differs from the first embodiment in that the TCP port number monitor of the first embodiment is deleted and, instead, an address storage unit 41 for storing an address for which performance/reliability is important is provided. The transmission-source address of a terminal which transmits a frame requiring a real-time property or high quality/high reliability or a destination address of a terminal which desires a frame having a high quality/high reliability is registered in the address storage unit 41 in advance. In this case, the registered address is a MAC address, IP address or address that is a combination of the MAC and IP addresses.

The multiple-path transmission discriminator 27 acquires the destination address or transmission-source address of a frame, which has been received from a terminal, from the destination address recognition unit 26, checks to determine whether this address matches an address that has been stored in the address storage unit 41 and, if a matching address is found, instructs the routing processor 28 to send the received frame to a plurality of paths in the direction of the destination. When the routing processor 28 is so instructed to send the frame to a plurality of paths, the routing processor 28 refers to the address table 29, obtains two input/output interfaces (e.g., input/output interfaces $30_1$, $30_2$) conforming to the destination address and instructs the switch 24 to send the frame to the interfaces $30_1$, $30_2$.

Figure 10:
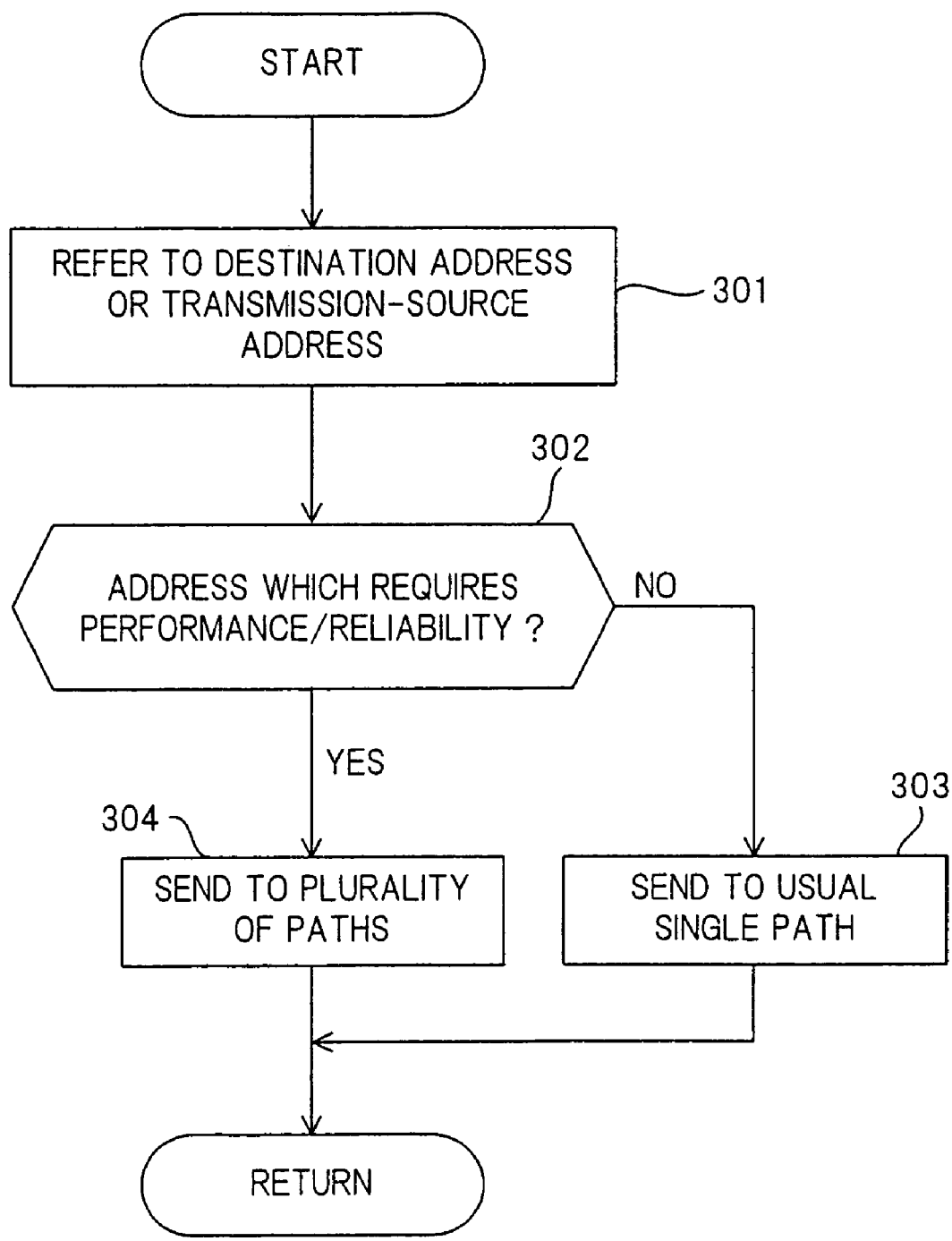
FIG. 10 is a flowchart of third transmission processing executed by a frame forwarding installation on the side of a transmitting terminal.

FIG. 10 is a flowchart of transmission processing executed by a frame forwarding installation on the side of a transmitting terminal according to a second embodiment of the present invention.

If a frame is received from a terminal, the multiple-path transmission discriminator 27 refers to the destination address or transmission-source address in the header (step 301) and determines whether the address has been registered in the address storage unit 41 (step 302). If the address has not been registered, the routing processor 28 sends the received frame to a single path conforming to the destination address via the switch 24 (step 303). If the address has been stored in the address storage unit 41, however, the multiple-path transmission discriminator 27 instructs the routing processor 28 to send the received frame to a plurality of paths. As a result, the routing processor 28 refers to the address table 29 and controls the switch 24 so as to send the received frame to two or more paths conforming to the destination address (step 304). The above-described processing is thenceforth repeated whenever a frame is received from a terminal, thereby sending frames to the network paths of the backbone LAN.

The reception processing executed by the frame forwarding installation of the second embodiment adopts the reception processing of FIGS. 7 and 8. In accordance with the second embodiment, terminals and hosts can be provided with a high level of service in terms of quality and reliability.

(D) Third Embodiment

Figure 11:
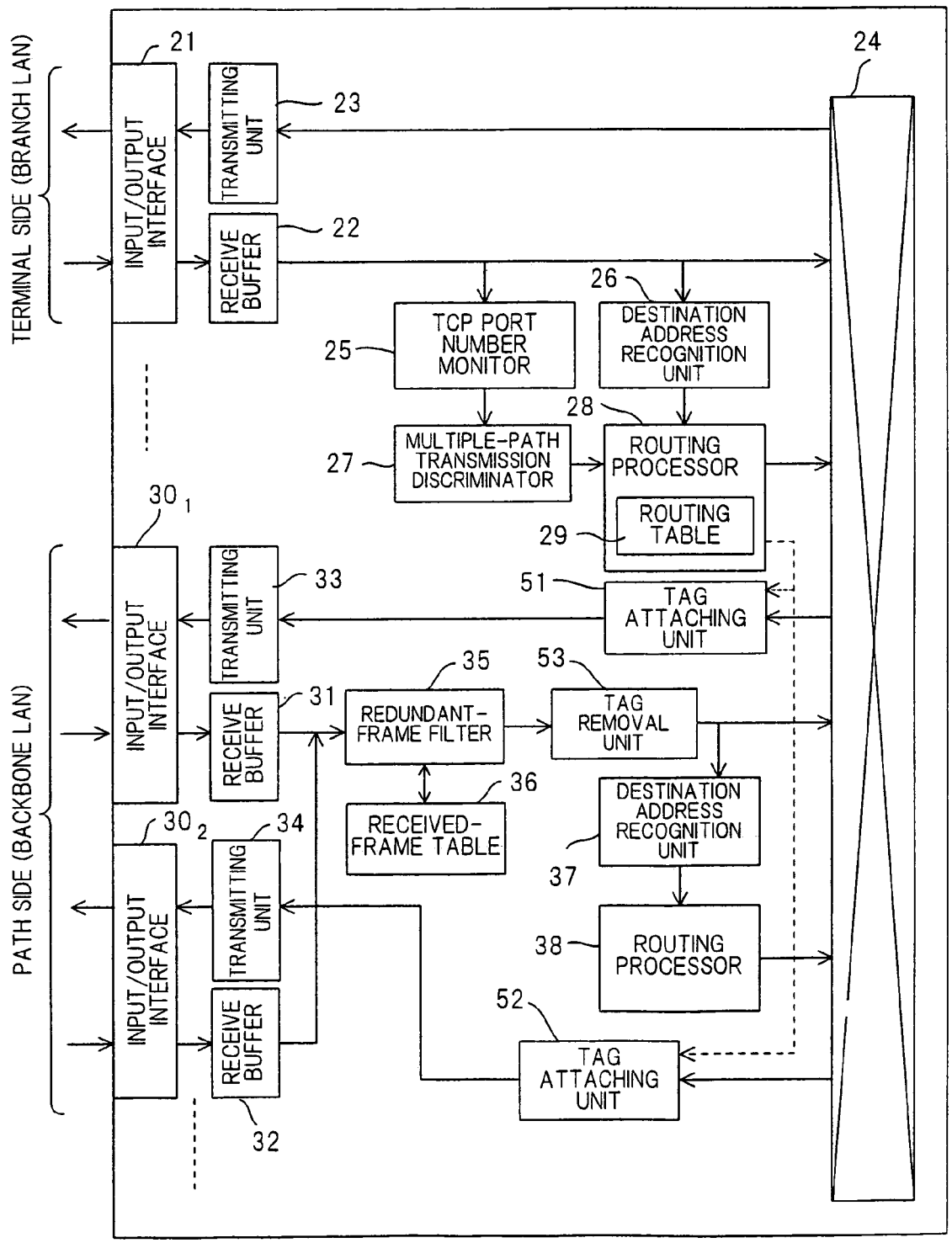
FIG. 11 is a block diagram illustrating the construction of a frame forwarding installation according to a third embodiment of the present invention.

FIG. 11 is a block diagram showing the construction of a frame forwarding installation according to a third embodiment of the present invention. Components in FIG. 11 identical with those of the first embodiment shown in FIG. 2 are designated by like reference characters. This embodiment differs in the following respects:

(1) Tag attaching units 51, 52 are provided between the transmitting units 33, 34 and the switch 24. In accordance with a command from the routing processor 28, the tag attaching units 51, 52 each attach a tag to a frame, which is directed to the destination terminal, received from the path of a branch LAN and send the frame to a path of a backbone LAN.

(2) A tag removal unit 53 is provided between the redundant-frame filter 35 and the switch 24. The tag removal unit 53 removes a tag from a frame, which is directed to the destination terminal, received from the path of a backbone LAN and inputs the frame without the tag to the switch 24.

The tag is attached to the frame in order to specify the frame identifier and is applicable to a case where data for identifying a frame, such as a sequence number SN, is not contained in the header. FIG. 12 is a diagram useful in describing a frame to which a tag TG has been attached. The tag TG includes at least a frame identifier FRID and, when appropriate, a destination address, a transmission-source address and a control signal.

Figure 13:
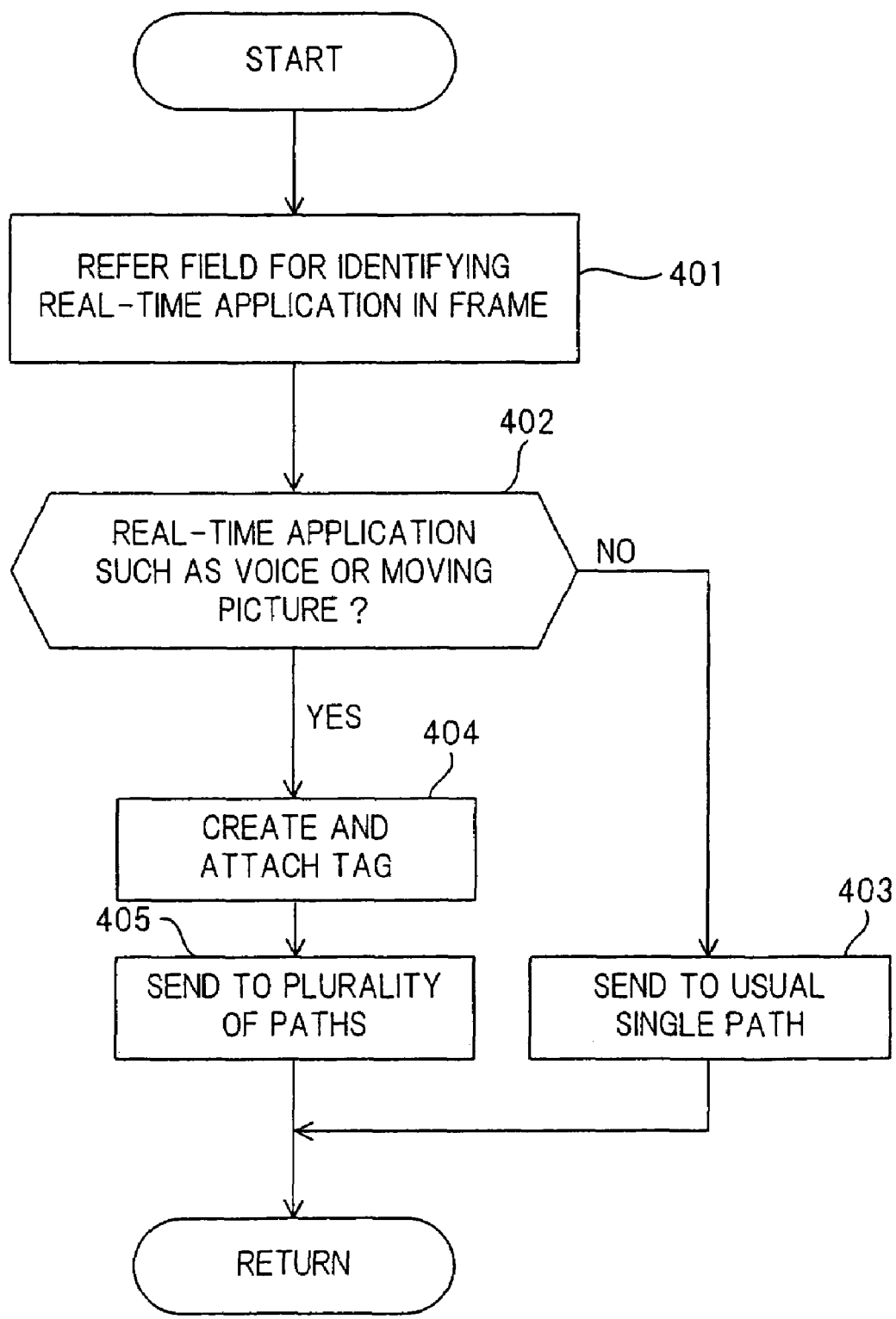
FIG. 13 is a flowchart of fourth transmission processing executed by a frame forwarding installation on the side of a transmitting terminal.

(a) Transmission Processing (a-1) When Reference is Made to a Real-Time Application FIG. 13 is a flowchart of transmission processing executed by a frame forwarding installation on the side of a transmitting terminal for sending a frame to a plurality of paths in a case where a host application is a real-time application.

If a frame is received, the frame forwarding installation refers to the TCP port number in the frame (step 401) and determines whether the host application is a real-time application (step S402). If the application is not a real-time application, the frame forwarding installation sends the received frame to one path that conforms to the destination address (step 403). If the application is a real-time application, however, then the multiple-path transmission discriminator 27 instructs the routing processor 28 to send the received frame to a plurality of paths.

As a result, the routing processor 28 refers to the address table 29, controls the switch 24 so as to send the received frame to two or more paths that conform to the destination address and instructs the tag attaching units 51, 52 to create and attach a tag. In response, the tag attaching units 51, 52 each create a tag, which includes the frame identifier, and attach the tag to the frame (step 404). Next, the frame with the attached tag is sent to two or more paths conforming to the destination address via the transmitting units 33, 34 and input/output interfaces $30_1$, $30_2$ (step 405). The above-described processing is thenceforth repeated whenever a frame is received from a terminal, thereby sending frames to the paths of the backbone LAN.

Figure 14:
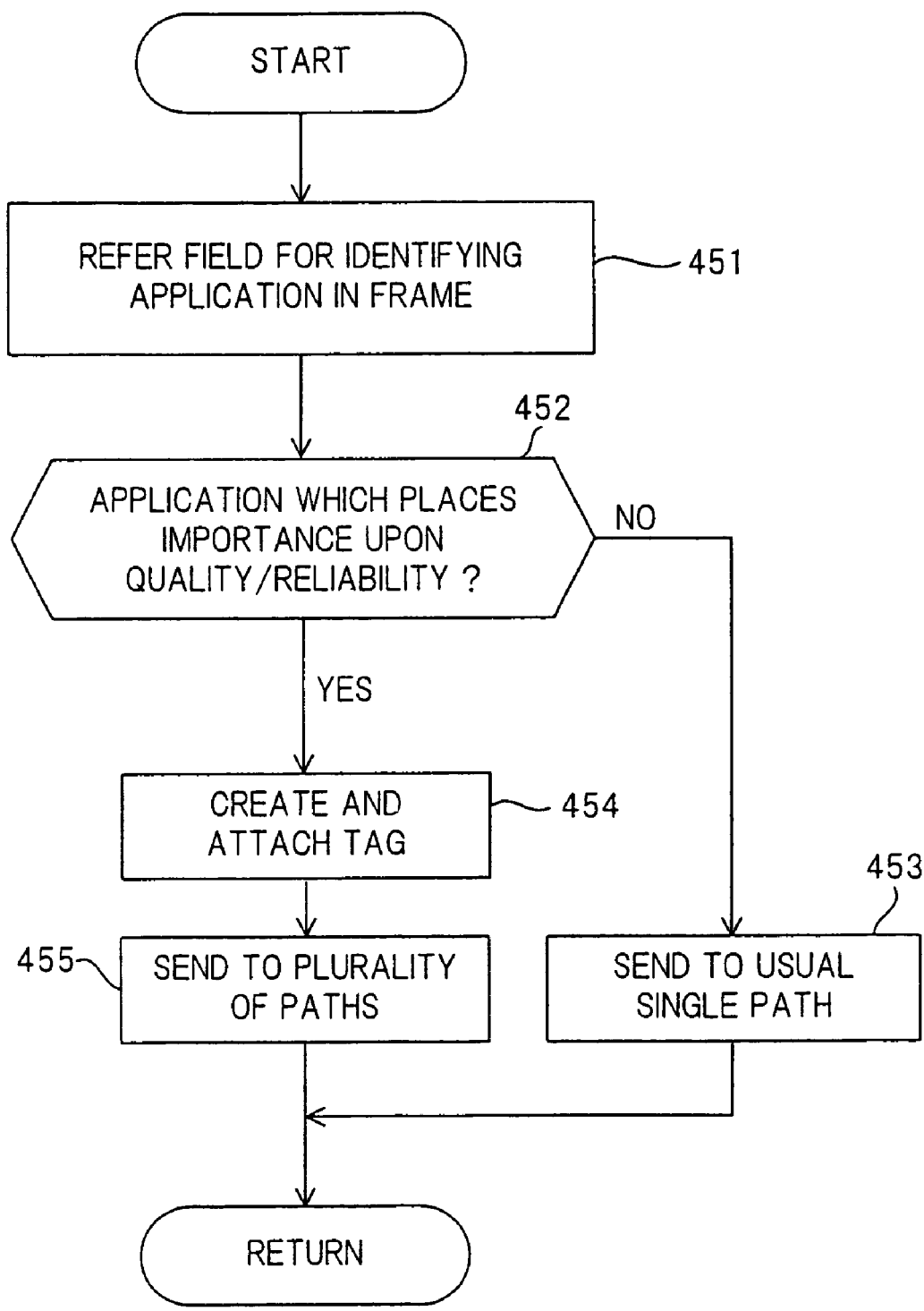
FIG. 14 is a flowchart of fifth transmission processing executed by a frame forwarding installation on the side of a transmitting terminal.

(a-2) When Reference is Made to an Application that Emphasizes Quality/Reliability FIG. 14 is a flowchart of transmission processing executed by a frame forwarding installation on the side of a transmitting terminal for sending a frame to a plurality of paths in a case where a host application is an application that places importance upon quality/reliability.

If a frame is received from a transmitting terminal, the frame forwarding installation refers to the TCP port number in the frame (step 451) and determines whether the host application is an application that places importance upon quality/reliability (step S452). If the application is not an application that places importance upon quality/reliability, the frame forwarding installation sends the received frame to one path that conforms to the destination address (step 453). If the application is an application that places importance upon quality/reliability, however, then the multiple-path transmission discriminator 27 instructs the routing processor 28 to send the received frame to a plurality of paths.

As a result, the routing processor 28 refers to the address table 29, controls the switch 24 so as to send the received frame to two or more paths that conform to the destination address and instructs the tag attaching units 51, 52 to create and attach a tag. In response, the tag attaching units 51, 52 each create a tag, which includes the frame identifier, and attach the tag to the frame (step 454). Next, the frame with the attached tag is sent to two or more paths conforming to the destination address via the transmitting units 33, 34 and input/output interfaces $30_1$, $30_2$ (step 455). The above-described processing is thenceforth repeated whenever a frame is received from a terminal, thereby sending frames to the network paths on the network side.

(b) Reception Processing

Figure 15:
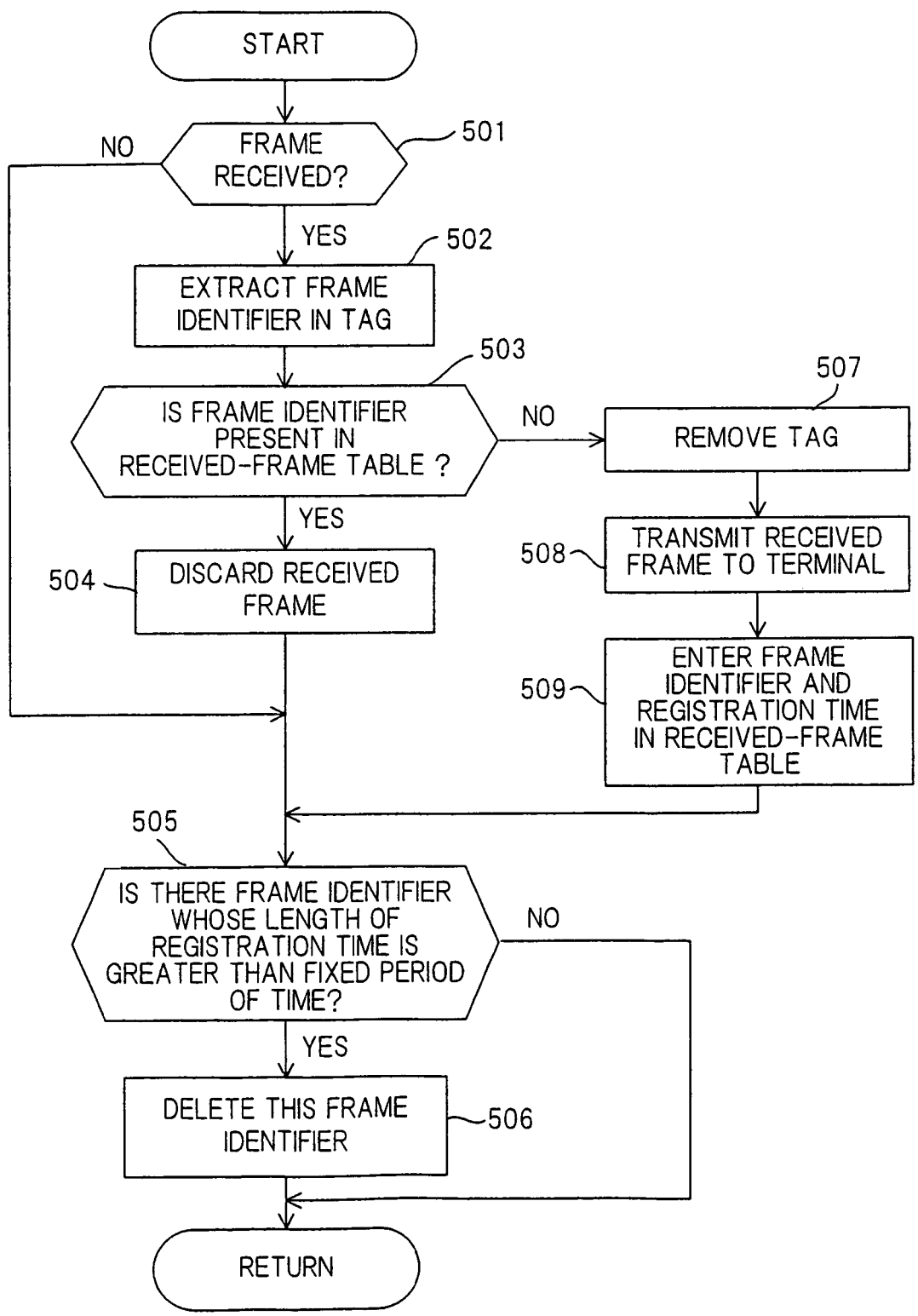
FIG. 15 is a flowchart of third reception processing executed by a frame forwarding installation on the side of a receiving terminal.

FIG. 15 is a flowchart of reception processing executed by a frame forwarding installation on the side of a destination terminal.

The redundant-frame filter 35 of the frame forwarding installation on the side of the destination terminal checks to see whether a frame has been received from a path of the backbone LAN (step 501). If a frame has been received, the redundant-frame filter 35 extracts the frame identifier contained in the tag (step 502), checks to determine whether the frame identifier is present in the received-frame table 36 (step 503) and, if it is, discards the received frame (step 504). Next, it is determined whether frame identifiers that have been registered in the received-frame table 36 include a frame identifier that has been registered for a period of time greater than a fixed period of time (step 505). If the decision rendered is "YES", then this frame identifier is deleted from the table (step 506). If the decision rendered is "NO", then no particular operation is performed and control returns to the beginning to repeat the above-described processing.

If it is determined at step S503 that the frame identifier does not exist in the received-frame table 36, on the other hand, the redundant-frame filter 35 outputs the received frame to the switch side and the tag removal unit 53 removes the tag from the frame (step 507). The routing processor 38 then refers to the destination address, recognizes that the frame is one to be sent to a terminal and controls the switch so as to transmit the received frame to the destination terminal (step 508). Thereafter, the redundant-frame filter 35 enters the frame identifier of the tag of the received frame and the present time (registration time) in the received-frame table 36 (step 509). Processing is then executed from step 505 onward. If a frame is not received at step S151, processing from step 505 onward is executed.

Thus, even though the same frame is sent to a plurality of paths from the frame forwarding installation on the side of the transmitting terminal, the frame forwarding installation on the side of the destination terminal accepts only the first arriving frame, transmits this frame to the destination terminal and discards later arriving frames.

Figure 16:
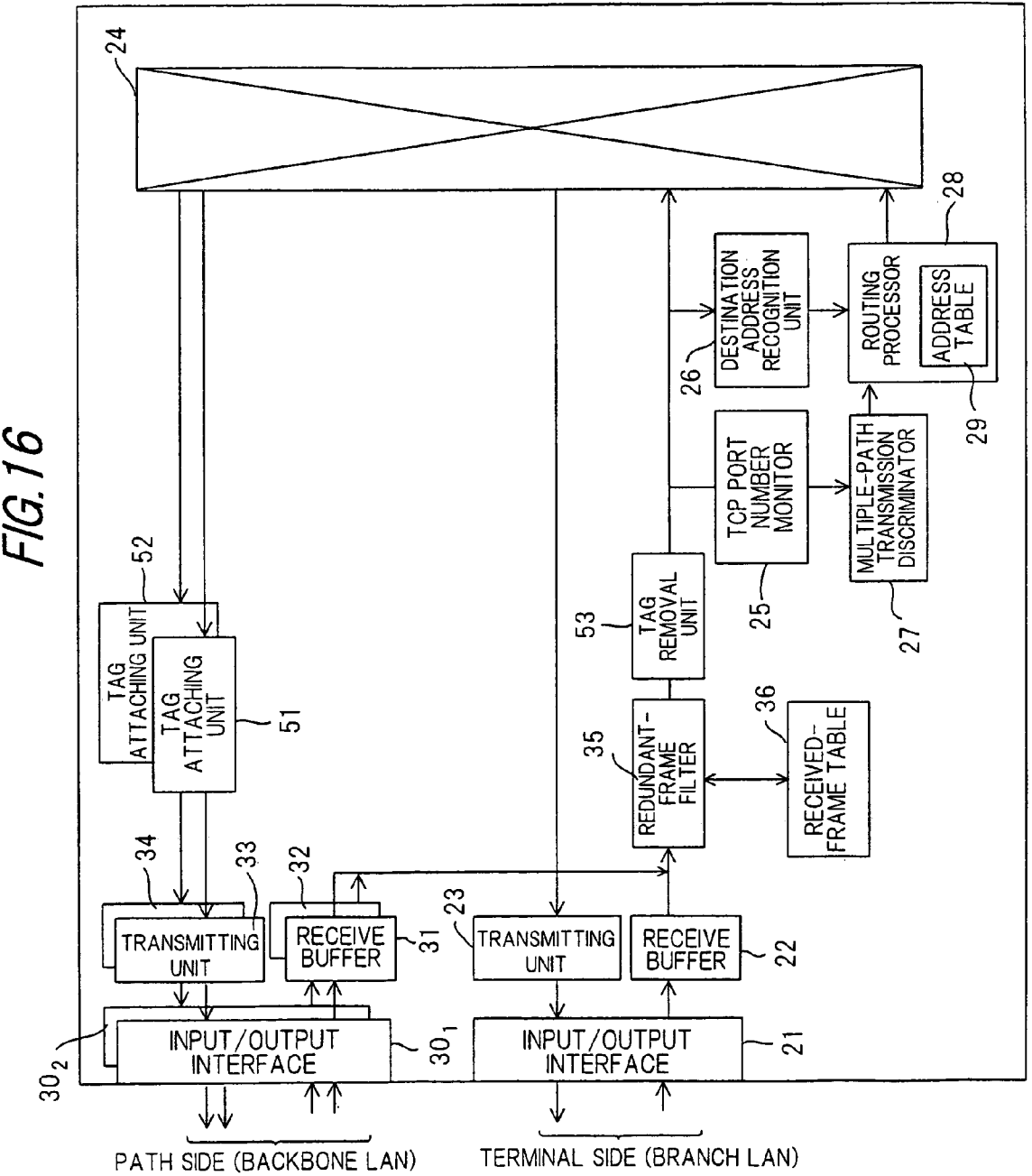
FIG. 16 is a block diagram illustrating a modification of the frame forwarding installation according to the third embodiment.

In FIG. 11, the destination address recognition units 26, 37 are separately provided and so are the routing processors 28, 38. However, an arrangement can be adopted in which the apparatus shares a single destination address recognition unit and a single routing processor. FIG. 16 illustrates an example of the arrangement of a frame forwarding installation in which the destination address recognition unit 26 and the routing processor 28 are shared.

(E) Fourth Embodiment

Figure 17:
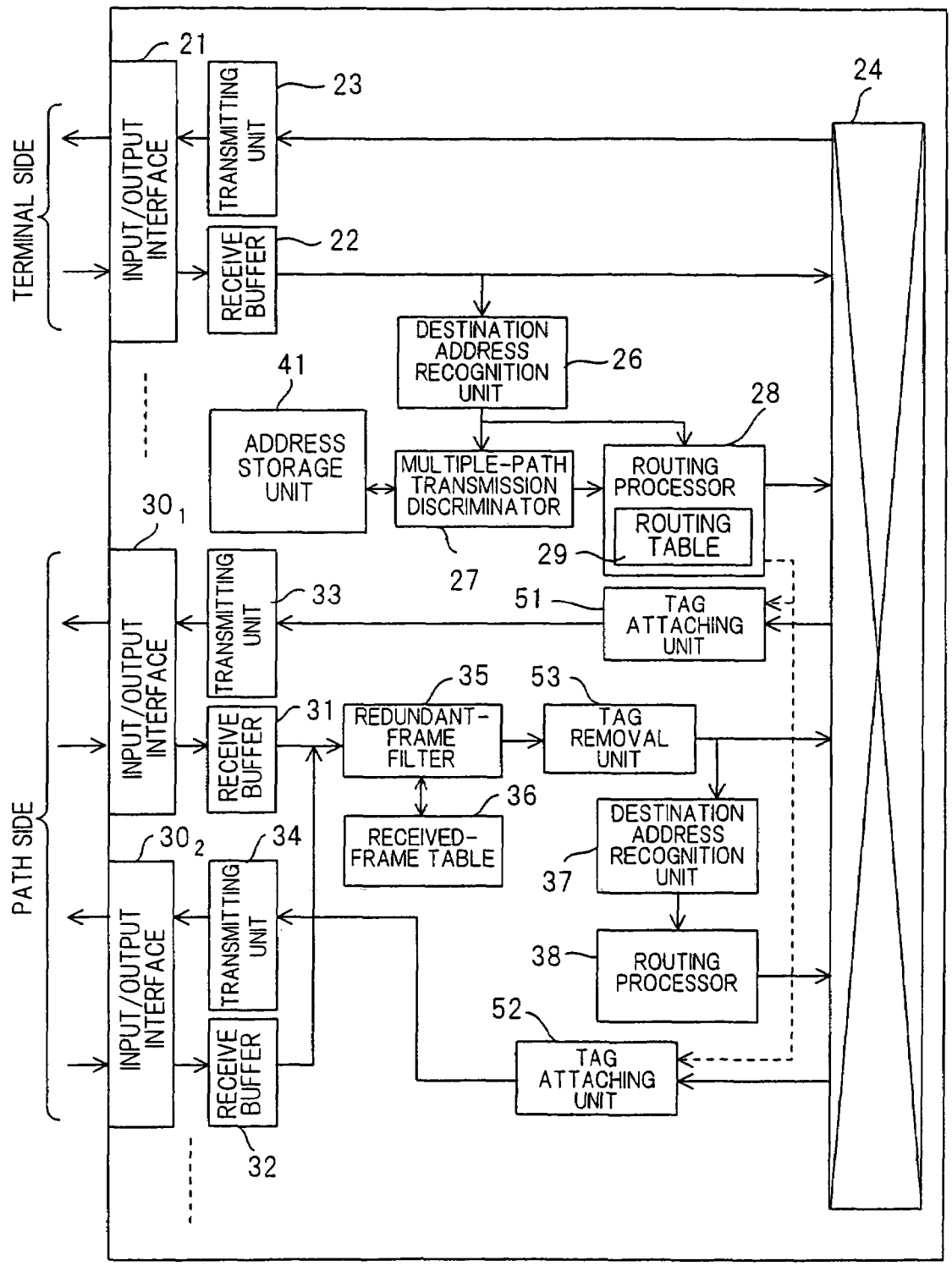
FIG. 17 is a block diagram illustrating the construction of a frame forwarding installation according to a fourth embodiment of the present invention.

FIG. 17 is a block diagram showing the construction of a frame forwarding installation according to a fourth embodiment of the present invention. Components in FIG. 17 identical with those of the second embodiment shown in FIG. 9 are designated by like reference characters. This embodiment differs in the following respects:

(1) Tag attaching units 51, 52 are provided between the transmitting units 33, 34 and the switch 24 and, in accordance with a command from the routing processor 28, the tag attaching units 51, 52 each attach a tag to a frame, which has been received from a terminal, and send the frame to a path of the backbone LAN.

(2) The tag removal unit 53 is provided between the redundant-frame filter 35 and the switch 24. The tag removal unit 53 removes a tag from a frame, which is directed to the destination terminal, received from the path of a backbone LAN and inputs the frame without the tag to the switch 24.

Figure 18:
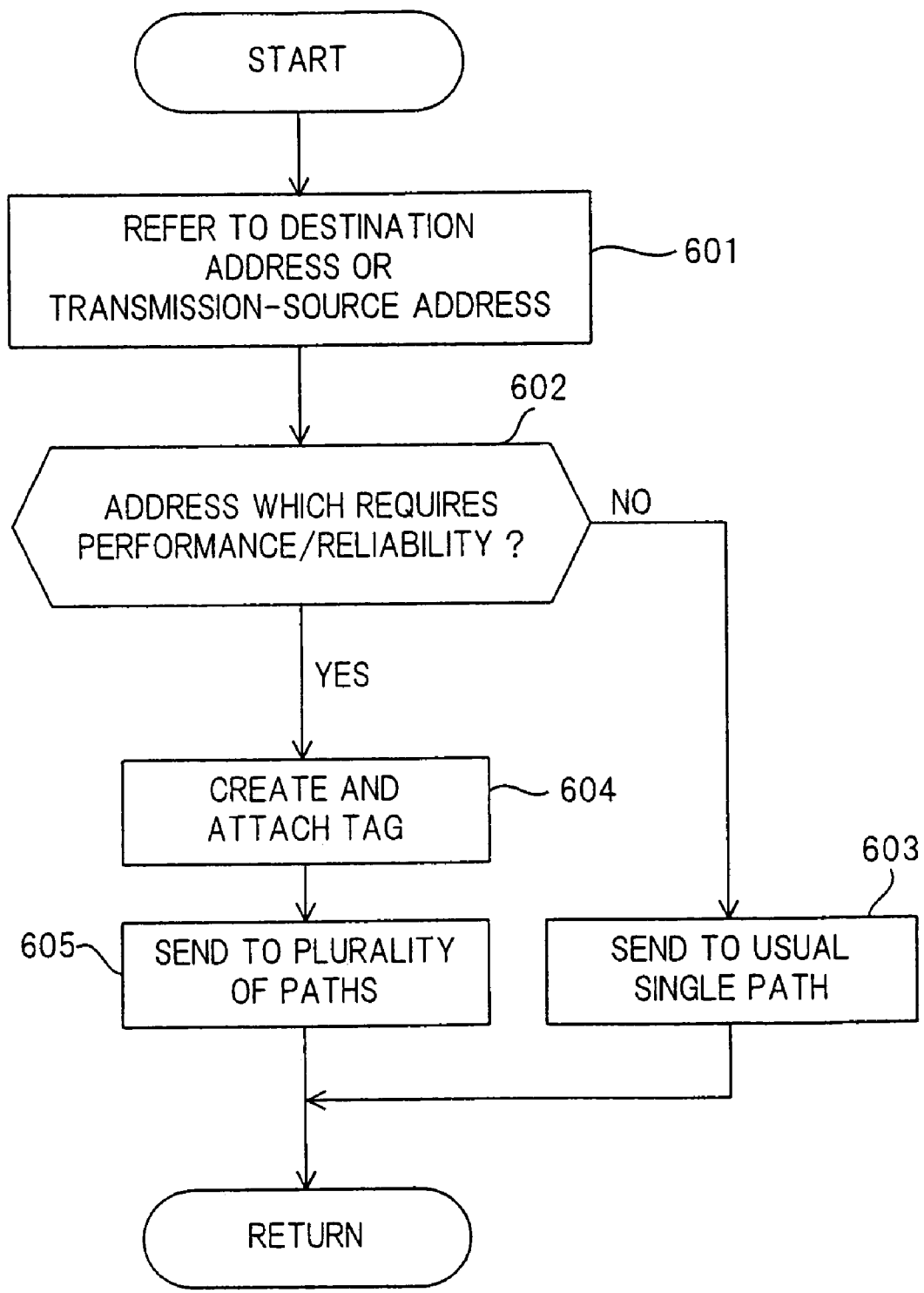
FIG. 18 is a flowchart of sixth transmission processing executed by a frame forwarding installation on the side of a transmitting terminal.

FIG. 18 is a flowchart of transmission processing executed by a frame forwarding installation according to the fourth embodiment.

If a frame is received from the transmitting terminal, the multiple-path transmission discriminator 27 of the frame forwarding installation refers to the destination address or transmission-source address in the header via the destination address recognition unit 26 (step 601) and checks to see whether this address has been registered in the address storage unit 41 (step 602). If the address has not been registered, the routing processor 28 sends the received frame to one path that conforms to the destination address via the switch 24 (step 603). If the address has been registered in the address storage unit 41, however, the multiple-path transmission discriminator 27 instructs the routing processor 28 to send the received frame to a plurality of paths.

As a result, the routing processor 28 refers to the address table 29, controls the switch 24 so as to send the received frame to two or more paths that conform to the destination address and instructs the tag attaching units 51, 52 to create and attach a tag. In response, the tag attaching units 51, 52 each create a tag, which includes the frame identifier, and attach the tag to the frame (step 604). Next, the frame with the attached tag is sent to two or more paths conforming to the destination address via the transmitting units 33, 34 and input/output interfaces 30₁, 30₂ (step 605). The above-described processing is thenceforth repeated whenever a frame is received from a terminal, thereby sending frames to the paths of the backbone LAN Reception processing according to the fourth embodiment is the same as that shown in FIG. 15.

Thus, in accordance with the present invention, a frame having a real-time property, such as voice or a moving image, can be sent to a plurality of paths simultaneously. Even if one path becomes congested or fails, the frame can be received from another normal path. This makes it possible to improve the quality and reliability of communication.

Further, in accordance with the present invention, frames requiring high quality/high reliability can be sent to a plurality of paths simultaneously and communication quality and reliability can be improved even if a path becomes congested or develops a fault.

Further, in accordance with the present invention, a frame can be communicated with high quality and high reliability, even if a path develops congestion or fault, by registering beforehand a transmission-source address for transmitting a frame requiring a real-time property or high quality/high reliability or a destination-terminal address which desires to receive a frame having a high quality/high reliability.

As many apparently widely different embodiments of the present invention can be made without departing from the spirit and scope thereof, it is to be understood that the invention is not limited to the specific embodiments thereof except as defined in the appended claims.

What is claimed is:

1. A frame forwarding installation for sending a received frame to one of a plurality of paths conforming to a destination address contained in a header of the frame, which has been received from a transmitting terminal, comprising:
   an application discriminating unit for referring to the header of the received frame and determining whether an application of a host layer in the transmitting terminal is a real-time application; and
   a frame transmitting unit for sending in duplicate the received frame to a plurality of paths in parallel in the direction of a destination if the application is the real-time application, and for sending the received frame to one of said plurality of paths in the direction of the destination if the application is not the real-time application.

2. The frame forwarding installation according to claim 1, wherein said application discriminating unit determines that the application of the host layer is the real-time application when a port number of the received frame matches a port number of the real-time application.

3. The frame forwarding installation according to claim 1, further comprising a plurality of interface units;
   wherein said frame transmitting unit has an address table which specifies the plurality of interface units in association with a destination address and sends the received frame to the plurality of paths via the plurality of interface units, which conform to the destination address, if the application is the real-time application.

4. The frame forwarding installation according to claim 1, further comprising a tag attaching unit for attaching a tag, which includes a frame identifier, to the frame;
   wherein the frame forwarding installation on the side of a receiving terminal utilizes the frame identifier when determining whether an identical frame has already been received or not.

5. A frame forwarding installation for sending a received frame to one of a plurality of paths conforming to a destination address contained in a header of the frame, which has been received from a transmitting terminal, comprising:
   an application-type discriminating unit for referring to the header of the received frame and discriminating the type of application of a host layer in the transmitting terminal; and
   a frame transmitting unit for transmitting in duplicate the received frame to a plurality of paths in parallel in the direction of a destination if the type of application is a predetermined type, and for sending the received frame to one of said plurality of paths in the direction of the destination if the type of application is not the predetermined type.

6. The frame forwarding installation according to claim 5, wherein said application-type discriminating unit discriminates the type of application of the host layer from a TCP port number of the received frame.

7. The frame forwarding installation according to claim 5, further comprising a plurality of interface units;
   wherein said frame transmitting unit has an address table which specifies the plurality of interface units in association with the destination address and sends the received frame to the plurality of paths via the plurality of interface units, which conform to the destination address, if the type application is the predetermined type.

8. The frame forwarding installation according to claim 5, further comprising a tag attaching unit for attaching a tag, which includes a frame identifier, to a frame;
   wherein a frame forwarding installation on the side of a receiving terminal utilizes the frame identifier when determining whether an identical frame has already been received or not.

9. A frame forwarding installation for sending a received frame to one of a plurality of paths conforming to a destination address contained in a header of the frame, which has been received from a transmitting terminal, comprising:

> an address-match discriminating unit for determining whether the destination address or transmission-source address contained in the header of the received frame matches an address that has already been registered; and
>
> a frame transmitting unit for sending in duplicate the received frame to a plurality of paths in parallel in the direction of a destination if the addresses match, and for sending the received frame to one of said plurality of paths in the direction of the destination if the addresses do not match.

10. The frame forwarding installation according to claim 9, further comprising a plurality of interface units;

> wherein said frame transmitting unit has an address table which specifies a plurality of interface units in association with a destination address and sends the received frame to a plurality of paths via a plurality of interface units, which conform to a destination address, if the addresses match.

11. The frame forwarding installation according to claim 9, further comprising a tag attaching unit for attaching a tag, which includes a frame identifier, to the frame;

> wherein a frame forwarding installation on the side of a receiving terminal utilizes the frame identifier when determining whether an identical frame has already been received or not.

* * * * *